United States Patent
Ho et al.

(10) Patent No.: US 10,773,455 B2
(45) Date of Patent: Sep. 15, 2020

(54) 3D PRINTING METHOD USING STRENGTHENED AUXILIARY WALL

(71) Applicants: XYZPRINTING, INC., New Taipei (TW); KINPO ELECTRONICS, INC., New Taipei (TW)

(72) Inventors: Kwan Ho, New Taipei (TW); Hsin-Ta Hsieh, New Taipei (TW); Ting-Hsiang Lien, New Taipei (TW); Yu-Ting Huang, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 317 days.

(21) Appl. No.: 15/926,634

(22) Filed: Mar. 20, 2018

(65) Prior Publication Data
US 2019/0061231 A1 Feb. 28, 2019

(30) Foreign Application Priority Data
Aug. 31, 2017 (CN) .......................... 2017 1 0770690

(51) Int. Cl.
*B29C 64/118* (2017.01)
*B29C 64/393* (2017.01)
(Continued)

(52) U.S. Cl.
CPC .......... *B29C 64/118* (2017.08); *B29C 64/106* (2017.08); *B29C 64/209* (2017.08);
(Continued)

(58) Field of Classification Search
CPC ... B29C 64/106; B29C 64/118; B29C 64/209; B29C 64/245; B29C 64/35;
(Continued)

(56) References Cited

U.S. PATENT DOCUMENTS 9,421,713 B2 * 8/2016 Swanson ............... B29C 64/106
9,690,274 B1 * 6/2017 Markov ................. B33Y 50/02
(Continued)

FOREIGN PATENT DOCUMENTS

CN 103009630 B 4/2017
CN 106696277 A 5/2017
(Continued)

OTHER PUBLICATIONS

Search Report dated Sep. 19, 2018 of the corresponding European patent application.
(Continued)

*Primary Examiner* — Michael M. Robinson
*Assistant Examiner* — Victoria Bartlett
(74) *Attorney, Agent, or Firm* — Chun-Ming Shih; HDLS IPR Services

(57) ABSTRACT

A 3D slicing and printing method using strengthened auxiliary wall is provided. The method is to control a 3D printer (3) to retrieve multiple layers of object print data corresponding to a 3D object (90), and multiple layers of wall print data and raft print data, print multiple layers of raft slice physical models (400,60) on a print platform (307) layer by layer according to the raft print data, print multiple layers of wall slice physical models (420-421,80-81) on the printed raft slice physical models (400,60) layer by layer according to the wall print data, and print multiple layers of 3D slice physical models (50-53,70-71) layer by layer according to the object print data during printing the raft slice physical models (400,60) and the wall slice physical models (420-421,80-81). It can effectively prevent the auxiliary wall (42,8) from collapsing and failure of printing a whole 3D physical model (5,7) via making a raft structure (40,6) be arranged under the auxiliary wall (42,8).

7 Claims, 11 Drawing Sheets

(51) Int. Cl.
*B29C 67/00* (2017.01)
*B29C 64/209* (2017.01)
*B33Y 10/00* (2015.01)
*B29C 64/245* (2017.01)
*B29C 64/35* (2017.01)
*B29C 64/106* (2017.01)
*B33Y 30/00* (2015.01)
*B33Y 40/00* (2020.01)
*B33Y 50/02* (2015.01)

(52) U.S. Cl.
CPC ............ *B29C 64/245* (2017.08); *B29C 64/35* (2017.08); *B29C 64/393* (2017.08); *B29C 67/0007* (2013.01); *B33Y 10/00* (2014.12); *B33Y 30/00* (2014.12); *B33Y 40/00* (2014.12); *B33Y 50/02* (2014.12)

(58) Field of Classification Search
CPC ... B29C 64/393; B29C 67/0007; B33Y 10/00; B33Y 40/00; B33Y 50/02
See application file for complete search history.

(56) References Cited

U.S. PATENT DOCUMENTS

| | | | |
|---|---|---|---|
| 2013/0066812 A1* | 3/2013 | Nehme | ................ G06T 17/005 705/400 |
| 2014/0252684 A1 | 9/2014 | Swanson et al. | |
| 2015/0190967 A1 | 7/2015 | Stava et al. | |
| 2015/0321425 A1* | 11/2015 | Stava | ...................... G06F 30/00 700/98 |

FOREIGN PATENT DOCUMENTS

| | | |
|---|---|---|
| JP | 2012096427 A | 5/2012 |
| JP | 2017077683 A | 4/2017 |
| JP | 2017105063 A | 6/2017 |
| TW | 201613771 A | 4/2016 |
| TW | 201729022 A | 8/2017 |
| WO | 2017113161 A1 | 7/2017 |

OTHER PUBLICATIONS

Office Action dated Feb. 20, 2020 of the corresponding Indian patent application.

* cited by examiner

3D PRINTING METHOD USING STRENGTHENED AUXILIARY WALL

BACKGROUND OF THE INVENTION

Field of the Invention

The technical field relates to 3D printing method and more particularly related to 3D slicing and printing method using strengthened auxiliary wall.

Description of Related Art

The FDM (Fused Deposition Modeling) 3D printer has ability of loading print data inputted by a user, and extruding print materials to its print platform for printing a corresponding 3D physical model by stacking.

More specifically, the FDM 3D printer is configured to use the thermoplastic print materials to print a 3D physical model. During print, the FDM 3D printer controls its modeling nozzle to heat and extrude the molten print materials to the print platform for manufacturing each print layer of the 3D physical model constituted of the print materials.

Some disadvantages of the FDM 3D printer are below. The molten print materials may outflow from the modeling nozzle during the modeling nozzle waiting for print (such as another nozzle is printing). In this status of partial print materials having out-flowed from the modeling nozzle, the FDM 3D printer may be failure in print caused by the discontinuous provision of print materials when print next time.

To solve above-mentioned problems, a 3D printing method using auxiliary wall had been provided. The 3D printing method using auxiliary wall of the related art is to control the modeling nozzle to try to print a layer of auxiliary wall for ensuring that the modeling nozzle is under the status of continuous provision of print materials every time the modeling nozzle stops waiting and continues to print (such as the print of another nozzle finishes), and controls the modeling nozzle to print the 3D physical model. The 3D printing method using auxiliary wall of the related art can prevent the 3D physical model from print failure caused by discontinuous provision of print materials via making the status of discontinuous provision of print materials occur during printing the auxiliary wall.

However, to prevent the auxiliary wall from occupying too much space of the print platform, the auxiliary wall in the related art is usually configured to be slender structure and unstable. Moreover, a risk of the auxiliary wall collapsing increase because the status of discontinuous provision of print materials occurs during printing the auxiliary wall. Thus, the 3D printing method using auxiliary wall of the related art may be failure in print caused by the auxiliary wall collapsing during print.

SUMMARY OF THE INVENTION

The present disclosed example is directed to a 3D printing method using strengthened auxiliary wall, the present disclosed example can prevent the auxiliary wall from collapsing via strengthening a structure of the auxiliary wall.

One of the exemplary embodiments, a 3D slicing and printing method using strengthened auxiliary wall applied to a 3D printer comprising a print platform and a modeling nozzle and a slicing software used to be installed in an electronic device, comprises following steps: a) retrieving 3D object data corresponding to a 3D object at the electronic device executing the slicing software; b) retrieving multiple layers of wall print data corresponding to a wall object; c) when a raft object separates from the 3D object, generating multiple layers of raft print data according to a size of the wall object and a first outspreading distance for outspreading from the wall object; d) when the 3D object and the wall object are arranged on the raft object, calculating a first bounding box enclosing the 3D object and the wall object, configuring a size of the raft object according to the first bounding box and at least one of a vertical outspreading distance for vertically expanding from the first bounding box and a horizontal outspreading distance for horizontally expanding from the first bounding box, and generating the multiple layers of raft print data according to the size of the raft object; e) generating multiple layers of object print data according to geometric information of the 3D object data; f) linking the multiple layers of wall print data, the multiple layers of raft print data, and the multiple layers of object print data together based on layer values, wherein when the raft object separates from the 3D object, the multiple layers of raft print data and the multiple layers of wall print data are merged to multiple layers of merged data, and each of the multiple layers of merged data is respectively linked to each of the multiple layers of object print data having the same layer value together, when the 3D object and the wall object are arranged on the raft object, the multiple layers of raft print data are configured as the bottom layers, and each of the multiple layers of wall print data are respectively link to each of the multiple layers of object print data having the same layer value together; g) controlling the modeling nozzle to print multiple layers of raft slice physical models on the print platform layer by layer according to the multiple layers of raft print data at the 3D printer; h) controlling the modeling nozzle to print multiple layers of wall slice physical models on the multiple layers of printed raft slice physical models layer by layer according to the multiple layers of wall print data after completion of printing all of the multiple layers of raft slice physical models, wherein the multiple layers of raft slice physical models are for increasing a contact area between the multiple layers of wall slice physical models and the print platform, and printing of the multiple layers of wall slice physical models is for ensuring that the modeling nozzle is under a status of continuous provision of print materials every time the modeling nozzle stops waiting and continues to print; and, i) controlling the modeling nozzle to print multiple layers of 3D slice physical models layer by layer according to the raft slice physical models the object print data during printing the multiple layers of raft slice physical models and the multiple layers of wall slice physical models, wherein when the raft object separates from the 3D object, the multiple layers of 3D slice physical models are printed at a position of the print platform different than the multiple layers of wall slice physical models, when the 3D object and the wall object are arranged on the raft object, the multiple layers of 3D slice physical models are printed on the multiple layers of raft slice physical models layer by layer after completion of printing the multiple layers of raft slice physical models.

The present disclosed example can effectively prevent the auxiliary wall from collapsing and failure of printing a whole 3D physical model via making a raft structure be arranged under the auxiliary wall.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
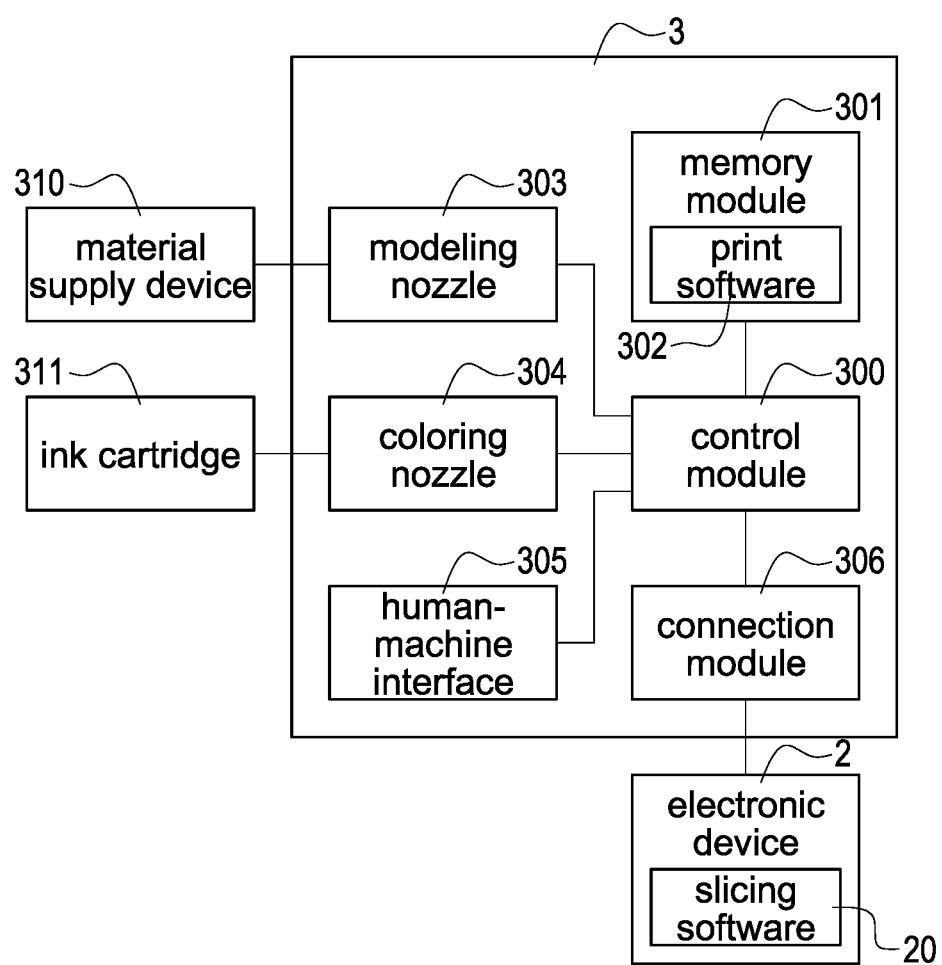
FIG. 1 is an architecture diagram of a 3D print system according to an embodiment of the present disclosed example.
Figure 2:
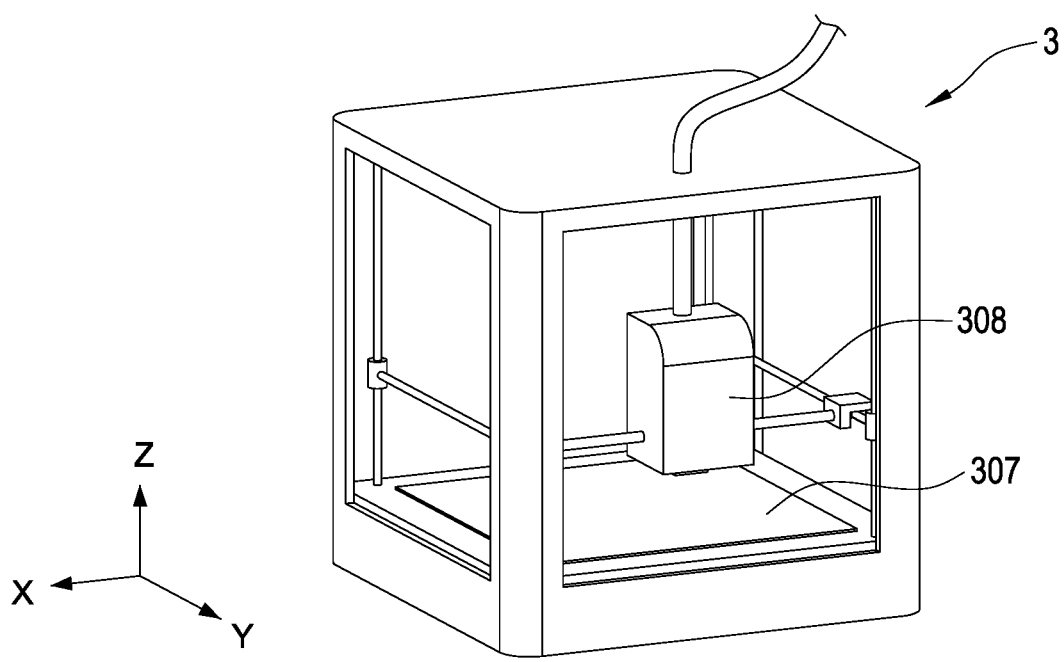
FIG. 2 is a schematic view of appearance of a 3D printer according to an embodiment of the present disclosed example.

Please refer to FIG. 1 and FIG. 2 simultaneously, FIG. 1 is an architecture diagram of a 3D print system according to an embodiment of the present disclosed example, and FIG. 2 is a schematic view of appearance of a 3D printer according to an embodiment of the present disclosed example. The present disclosed example discloses a 3D printing method using strengthened auxiliary wall (hereinafter printing method for abbreviation) applied to a 3D print system 1. The 3D print system 1 comprises a 3D printer 3 and a slicing software 20.

One of the exemplary embodiments, the slicing software 20 is stored in a memory (not shown in figure) of an electronic device 2 (such as laptop, tablet, PC or cloud server). Above-mentioned memory may be a non-transient computer readable recording media. A plurality of computer readable codes is recorded in the slicing software 20. A processor (not shown in figure) of the electronic device 2 may execute each of steps of slicing process of the printing method of each of embodiments of the present disclosed example after the processor executing the slicing software 20.

The 3D printer 3 mainly comprises a memory module 301, a modeling nozzle 303, a human-machine interface 305, a connection module 306, a print platform 307 and a control module 300 electrically connected to above-mentioned devices.

The modeling nozzle 303 is connected to a material supply device 310 storing print materials, and has ability of using the print materials to print.

One of the exemplary embodiments, the 3D printer 3 is a Fused Deposition Modeling (FDM) 3D printer, the material supply device 310 may provide thermoplastic materials, such as Acrylonitrile Butadiene Styrene (ABS) or Polylactic Acid (PLA), to the modeling nozzle 303, the modeling nozzle 303 may heat the materials for making the materials molten and executing 3D printing.

The memory module 301 is used to store data. The connection module 306 (such as USB module, Wi-Fi module or the other wired/wireless connection modules) is used to connect an external apparatus (such as the electronic device 2) for receiving data (such as object print data, raft print data and/or wall print data described later). The human-machine interface 305 (such as buttons, a monitor, indicators, a buzzer, or any combination of above elements) is used to receive a user operation and output the print-related information. The control module 300 is used to control the 3D print 3.

One of the exemplary embodiments, the memory module 301 is a non-transient computer readable recording media, and stores the print software 302. A plurality of computer readable codes is recorded in the print software 302. The control module 300 may perform each step of the printing process of each embodiment of the present disclosed example after execution of the print software 302.

One of the exemplary embodiments, the 3D print 3 has ability of color 3D printing. More specifically, the 3D printer 3 further comprises a coloring nozzle 304 electrically connected to the control module 300. The coloring nozzle 304 is connected to at least one ink cartridge 311 used to store ink, and is used to color the printed 3D slice physical models. One of the exemplary embodiments, the coloring nozzle 304 may comprises a plurality of sub-nozzles, each sub-nozzle is connected to each of the ink cartridges 311 with different colors (such as Cyan, Magenta, Yellow, and Black), and may implement full-color printing via color mixing.

One of the exemplary embodiments, the 3D printer 3 comprises a motion mechanism 308. The motion mechanism 308 is used to control the modeling nozzle 303 and the coloring nozzle 304 to move in one or more axis (such as the three axes of X-Y-Z) for print.

One of the exemplary embodiments, the motion mechanism 308 is arranged on the print platform 307, rather than being connected to the modeling nozzle 303 and the coloring nozzle 304. More specifically, the motion mechanism 308 may control the print platform 307 to move between one or more axes (such as the three axes of X-Y-Z), and the modeling nozzle 303 and the coloring nozzle 304 may print without any movement.

Figure 3:
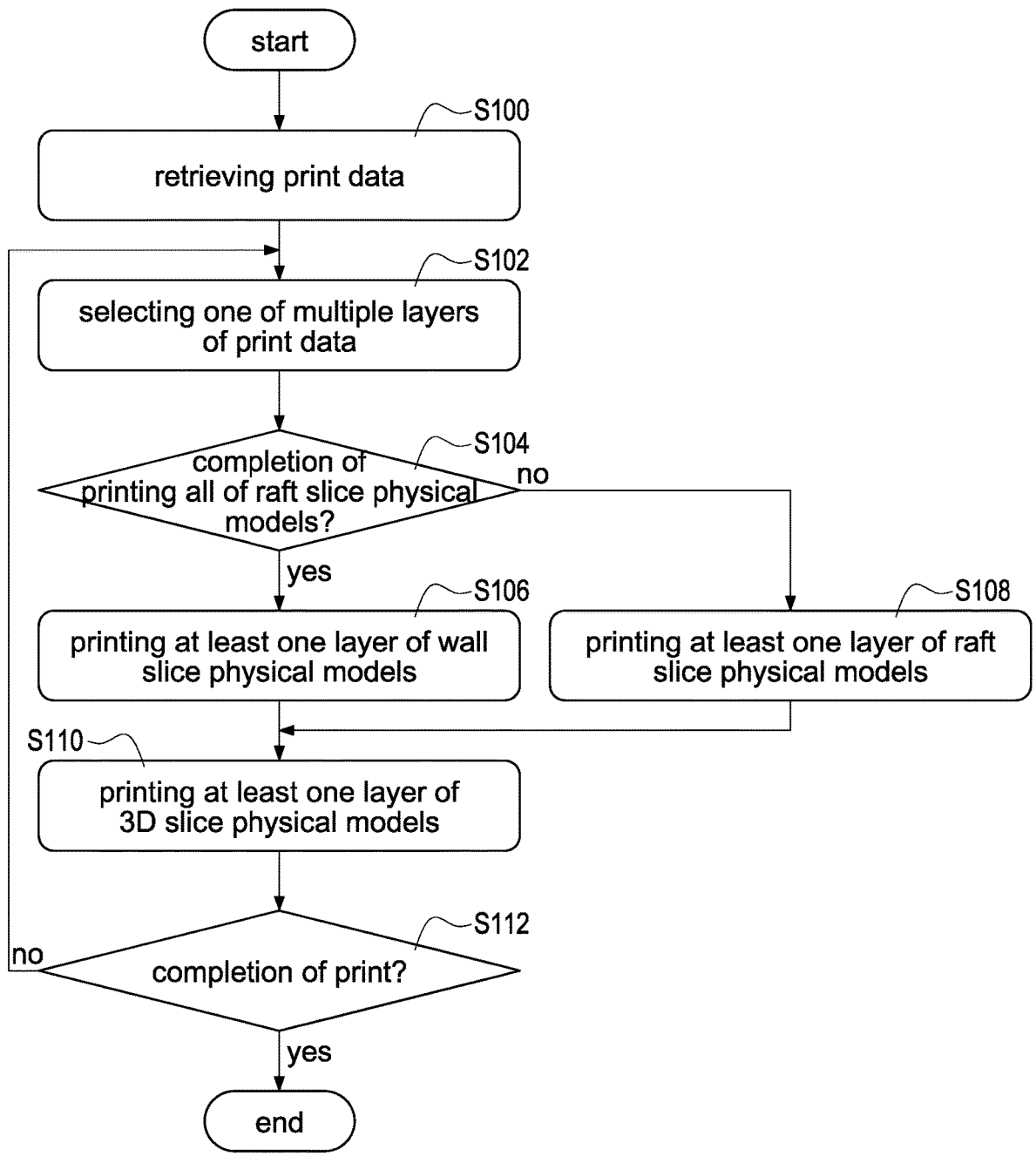
FIG. 3 is a flowchart of a printing method according to the first embodiment of the present disclosed example.

Please refer to FIG. 3, which is a flowchart of a printing method according to the first embodiment of the present disclosed example. The 3D printing method using strengthened auxiliary wall (hereinafter printing method for abbreviation) of each embodiment of the present disclosed example may be implemented by the 3D print system shown in any of FIG. 1 and FIG. 2. The printing method of this embodiment comprises following steps.

Step S100: the control module 300 of the 3D printer 3 retrieves print data which may comprise object print data corresponding to a 3D object, wall print data corresponding to a wall object and/or raft print data corresponding to a raft object. Each of above-mentioned print data may comprises a plurality of data sector corresponding to multiple layers, each data sector corresponds to a path. One layer of 3D slice physical models, wall slice physical models and raft slice physical models may be manufactured after the modeling nozzle 303 prints along the corresponding path.

Step S102: the control module 300 selects one of multiple layers of each print data in order, such as the first layer. One of the exemplary embodiments, the control module 300 selects one of multiple layer values in order, such as the layer value "1".

Step S104: the control module 300 determines whether all of raft slice physical models has been printed. Namely, the control module 300 determines whether all of multiple layers of raft print data has been selected and printed.

If the control module 300 determines completion of printing all of multiple layers of the raft slice physical models, the control module 300 performs a step S106. Otherwise, the control module 300 performs a step S108.

Step S106: the control module 300 controls the modeling nozzle 303 to print one layer of the wall slice physical model according to the selected one layer (namely, the layer having the same layer value) of the wall print data after completion of printing all of raft slice physical models. More specifically, the present disclosed example makes the raft slice physical models be added in the wall slice physical models (namely, the auxiliary wall) for increasing contact area between the auxiliary wall and the print platform 307, and strengthens stability of the auxiliary wall. Then, a step S110 is performed.

If the control module 300 determines that it is not completion of printing all of multiple layers of raft slice physical models, the control module 300 performs the step S108: the control module 300 controlling the modeling nozzle 303 to print one layer of the raft slice physical models according to selected one layer (namely, the layer having the same layer value) of the raft print data. Then, a step S110 is performed.

Step S110: the control module 300 prints one layer of the slice physical model according to the selected one layer (namely, the layer having the same layer value) of the object print data.

Figure 7:
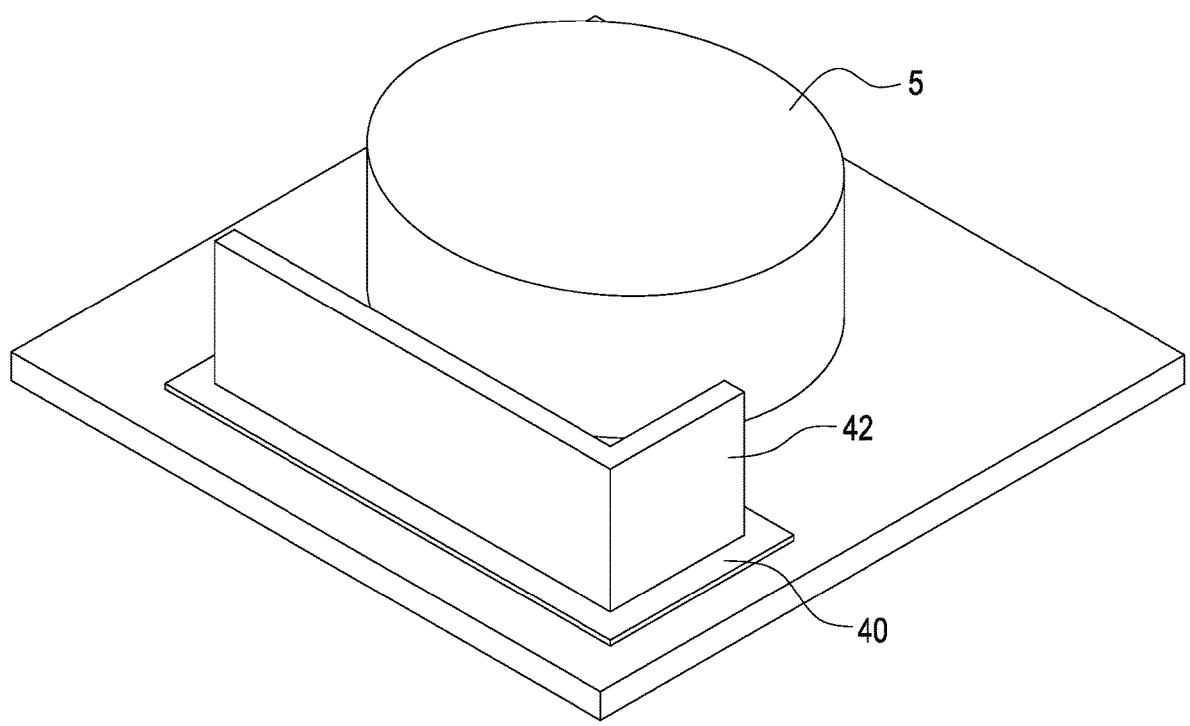
FIG. 7 is a schematic view of physical model according to one of embodiments of the present disclosed example.

One of the exemplary embodiments, a print position of the raft of the wall slice physical models separates from a print position of the 3D slice physical models and the raft (if it exists) thereof as shown in FIG. 7. More specifically, the control module 300 controls the modeling nozzle 303 to print the same layer of the 3D slice physical models or their raft at another position of the print 307 platform after printing one layer of the wall slice physical models (or the raft slice physical models). Or, the control module 300 may control the modeling nozzle 303 first to print one layer of 3D slice physical models or the raft thereof, and then to print the same layer of the wall slice physical models (or raft slice physical models) at another position of the print 307 platform (simultaneously).

Figure 10:
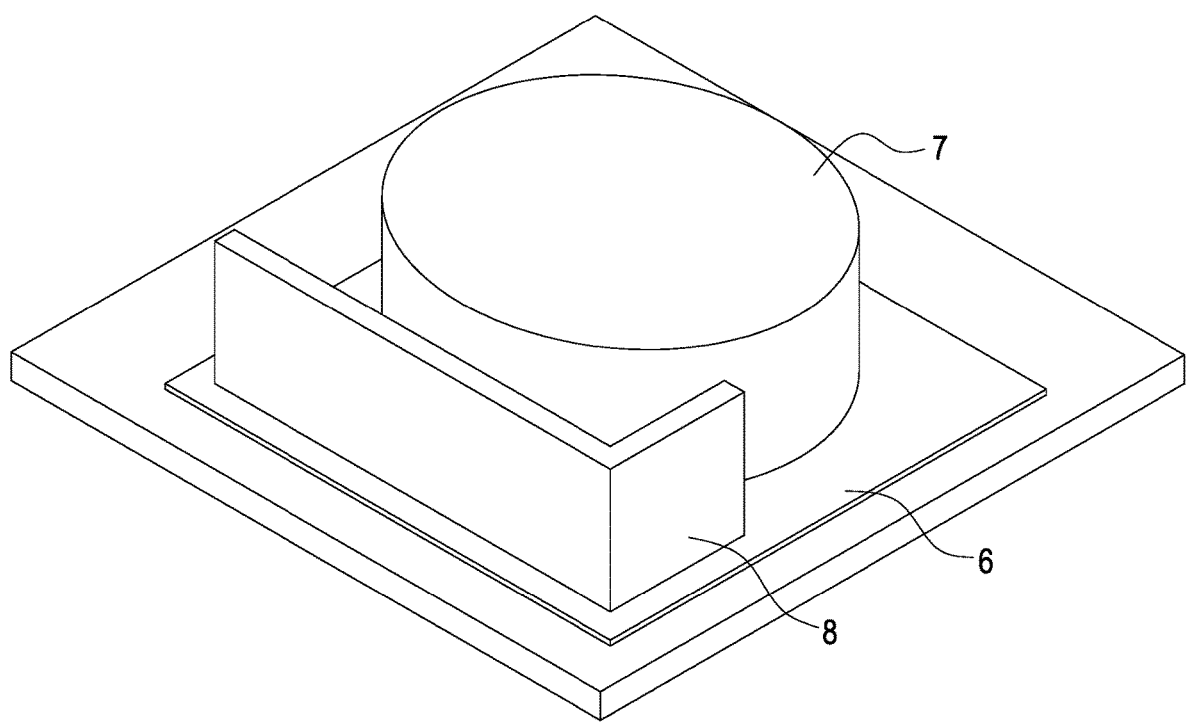
FIG. 10 is a schematic view of physical model according to one of embodiments of the present disclosed example.

One of the exemplary embodiments, the 3D slice physical models and the wall slice physical models are arranged on the same raft (namely, they share the same raft, as shown in FIG. 10). More specifically, the control module 300 controls the modeling nozzle 303 to print the multiple layers of the 3D slice physical models and wall slice physical models on the printed raft slice physical models layer by layer after completion of printing all of multiple layers of the raft slice physical models. On the other hand, in this embodiment, the control module 300 performs a step S112 after performing the step S108.

One of the exemplary embodiments, a function of scraping materials is provided. More specifically, the control module 300 may continuously determine whether a default condition satisfies during printing the 3D physical model, and controls the modeling nozzle 303 to execute the material-scraping operation to the printed wall slice physical model for scraping out the residual materials stuck on the modeling nozzle 303 when every time the default condition satisfies (such as executing the material-scraping operation every 20 seconds, executing the material-scraping operation after completion of printing each region of the single layer of the 3D slice physical model, or executing the material-scraping operation after completion of printing each layer of the 3D slice physical model). Thus, the present disclosed example can effectively prevent the residual materials stuck on the modeling nozzle 303 from sticking the 3D slice physical models, and improve the print quality.

Please be noted that the heights (number of printed layers) of the printed wall slice physical models and the printed 3D slice physical models are the same as each other during print because of printing the wall slice physical models and the 3D slice physical model layer by layer in turn. The present disclosed example can effectively reduce a motion distance and a motion time of the modeling nozzle 303 executing a scraping operation. Besides, the present disclosed example can effectively improve the accuracy of scraping operation because a height difference (namely, a distance in Z-axis) between the wall slice physical models and the 3D slice physical models do not need to consider, and prevent from incompleteness of the scraping operation and decline of the print quality, or prevent the modeling nozzle 303 from excessively colliding the wall slice physical models and making the wall slice physical models collapse.

Step S112: the control module 300 determines whether completion of print. Namely, the control module 300 determines whether each of the multiple layers of the print data has been selected and printed. One of the exemplary embodiments, the control module 300 determines whether all of the layer values has been selected.

If the control module 300 determines that completion of print (namely, all of the multiple layers of the print data), the control module 300 terminates the print. Otherwise, the control module 300 performs the steps S102-S110 again for selecting the other layer of the print data (such as the second layer of the layer having the layer value "2") and printing the other layer of the slice physical model.

The present disclosed example can effectively prevent the auxiliary wall from collapsing and failure in printing the 3D physical model via adding a raft structure on the auxiliary wall, and strengthen the stability of the auxiliary wall.

Figure 8A:
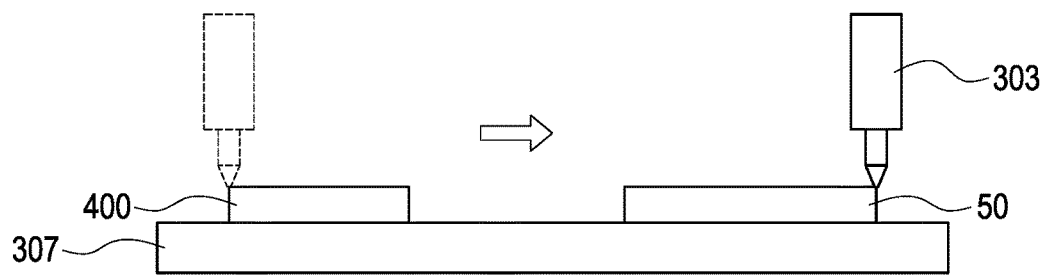
FIG. 8A is a first schematic view of print process according to one of embodiments of the present disclosed example.
Figure 8B:
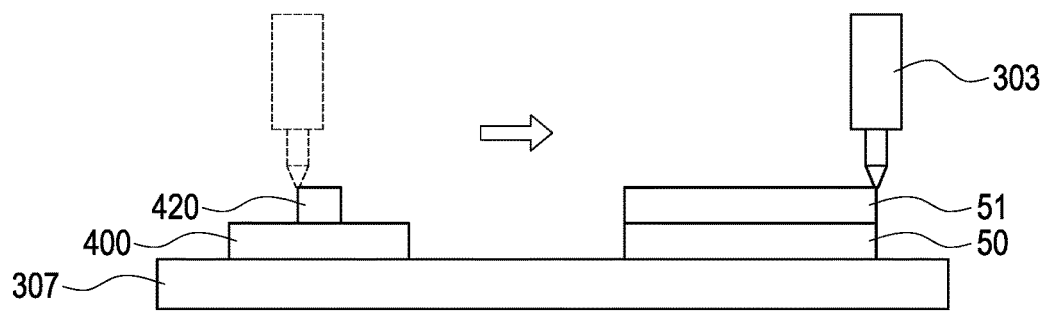
FIG. 8B is a second schematic view of print process according to one of embodiments of the present disclosed example.
Figure 9A:
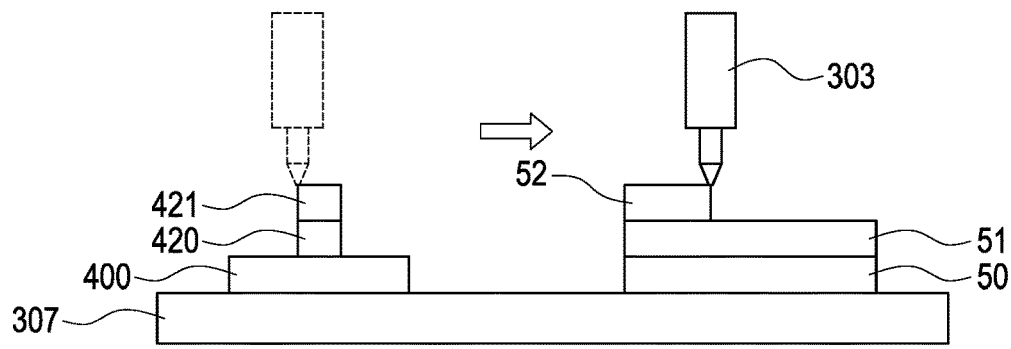
FIG. 9A is a first schematic view of a scraping operation according to one of embodiments of the present disclosed example.
Figure 9B:
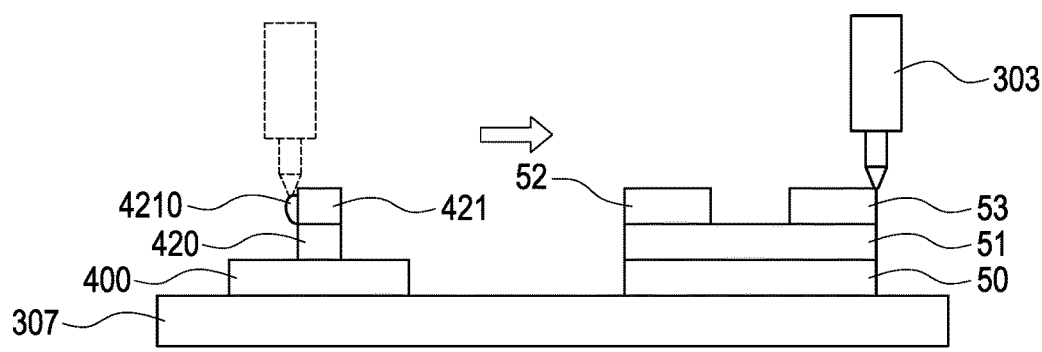
FIG. 9B is a second schematic view of a scraping operation according to one of embodiments of the present disclosed example.

Please refer to FIG. 7 to FIG. 9B simultaneously, FIG. 7 is a schematic view of physical model according to one of embodiments of the present disclosed example, FIG. 8A is a first schematic view of print process according to one of embodiments of the present disclosed example, FIG. 8B is a second schematic view of print process according to one of embodiments of the present disclosed example, FIG. 9A is a first schematic view of a scraping operation according to one of embodiments of the present disclosed example, and FIG. 9B is a second schematic view of a scraping operation according to one of embodiments of the present disclosed example. FIG. 7 to FIG. 8 are used to exemplary explain how to strengthen the auxiliary wall in the present disclosed example. FIG. 9A to FIG. 9B are used to explain how to execute the scraping operation of the present disclosed example.

In this embodiment, the print position of the raft 40 (all of the multiple layers of raft slice physical models) of the auxiliary wall 42 (all of the multiple layers of the wall slice physical models) and the print position of the 3D physical model 5 are separated from each other (as shown in FIG. 7). Besides, this embodiment only prints one layer of the raft slice physical models 400 as the raft 40.

As shown in FIG. 8A, during print, the modeling nozzle 303 first prints the first layer of the raft slice physical model 400 (having the layer value "1") on the print platform 307, and then prints the same layer of the 3D slice physical model 50 (having the layer value "1"). After completion of printing the raft slice physical model 400, as shown in FIG. 8B, the modeling nozzle 303 prints the first layer of the wall slice physical model 420 (having the layer value "2") on the last layer of the raft slice physical model 400, and then prints the same layer of the 3D slice physical model 51 (having the layer value "2"). Finally, the modeling nozzle 303 performs the print steps shown in FIG. 8B repeatedly to print and stack the multiple layers of 3D slice physical model for manufacturing the 3D physical model 5 as shown in FIG. 7.

Following description is used to explain how to execute the material-scraping operation. The molten print materials may outflow from the modeling nozzle 303 (hereinafter residual materials for abbreviation) during the modeling nozzle waiting for print (such as the modeling nozzle 303 is moving). To prevent the residual materials sticking the 3D physical model 5, the modeling nozzle 303 has necessary to execute the material-scraping operation regular or irregular. In this embodiment, the modeling nozzle 303 executes the material-scraping operation after completion of printing the single region of the single layer.

During print, as shown in FIG. 9A, the modeling nozzle 303 first prints one layer of the wall slice physical model 421 (having the layer value "3"), and prints one region of the same layer of the 3D slice physical model 52 (having the layer value "3"). Then, as shown in FIG. 9B, the modeling nozzle 303 executes the material-scraping operation to the printed wall slice physical model 421 for scraping out the residual materials 421 and leaving the residual materials on the wall slice physical model 421, and continue to print another region of the same layer of the 3D slice physical model 53 (having the layer value "3"). Thus, the present disclosed example can effectively prevent the residual materials 4210 from sticking the 3D slice physical models 53, and improve the print quality.

Figure 4:
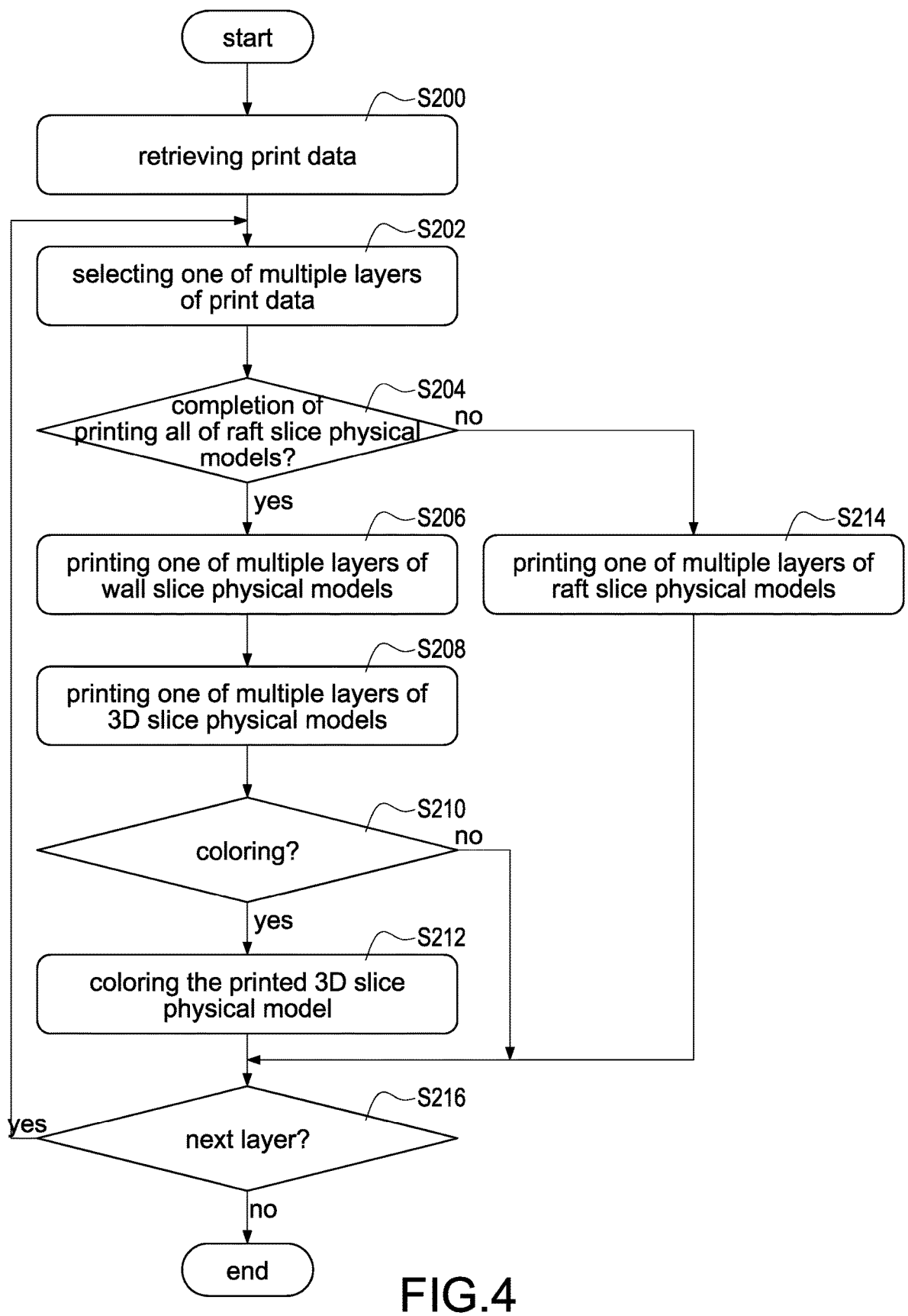
FIG. 4 is a flowchart of a printing method according to the second embodiment of the present disclosed example.

Please refer to FIG. 4, which is a flowchart of a printing method according to the second embodiment of the present disclosed example. In this embodiment, the 3D slice physical models share the same raft with the wall slice physical models (as shown in FIG. 10). Thus, this embodiment can effectively reduce usage of the space of the print platform 307 occupied by the raft, and make the 3D printer 3 provide more space of the print platform 307 for printing the 3D physical model with bigger size.

Besides, this embodiment further implements a color printing function. More specifically, the 3D printer 3 controls the coloring nozzle 304 to jet ink on each layer of the printed 3D slice physical models after completion of each layer of the 3D slice physical models by controlling the modeling nozzle 303. Please be noted that the color printing function may be implemented in anyone of the other embodiments (such as the first embodiment shown in FIG. 3). The printing method of this embodiment comprises following steps.

Step S200: the control module 300 retrieves the multiple layers of object print data corresponding to geometric information of a 3D object, the multiple layers of the wall print data corresponding to a wall object, the multiple layers of the raft print data corresponding to a raft object, and the multiple layers of the color print data corresponding to color information of the 3D object (such as a plurality of color 2D images). each of the multiple layers of the print data corresponding to a layer value.

Step S202: the control module 300 selects one of the multiple layers of each of above-mentioned print data in order, such as the first layer or the layer having the layer value "1".

Step S204: the control module 300 determines whether all of the raft slice physical models have been printed. Namely, the control module 300 determines whether all of the multiple layers of the raft print data has been selected and printed.

If the control module 300 determines completion of printing all of the multiple layers of the raft slice physical models, the control module 300 performs a step S106. Otherwise, the control module 300 performs the step S214.

Step S206: the control module 300 controls the modeling nozzle 303 to print one of the multiple layers of the wall slice physical models according to the selected one layer of the wall print data.

Step S208: the control module 300 controls the modeling nozzle 303 to print one of the multiple layers of the 3D slice physical models according to the selected one layer of the object print data.

Please be noted that there is not any order relationship between the step S206 and the step S208. One of the exemplary embodiments, the control module 300 may first perform the step S208, and then perform the step S206. Or, the control module 300 may perform the step S206 and S208 simultaneously.

Step S210: the control module 300 determines whether the layer of the printed 3D slice physical model is necessary to be colored according to the same layer of the color slice data. One of the exemplary embodiments, the control module 300 determines whether the same layer of the color print data comprises any color information, and determines that the layer of the printed 3D slice physical model is necessary to be colored if the same layer of the color print data comprises any color information.

If the control module 300 determines that the layer of the printed 3D slice physical model is necessary to be colored, the control module 300 performs step S212. Otherwise, the control module 300 performs step S216.

Step S212: the control module 300 controls the coloring nozzle 304 to color the layer of the printed 3D slice physical model according to the same layer of the color print data.

If the control module 300 determines that any of the raft slice physical models doesn't have been printed, the control module 300 performs a step S214: the control module 300 controlling the modeling nozzle 303 to print one of the multiple layers of raft slice physical models according to the selected one of the multiple layers of raft print data. Then, step S216 is performed.

Step S216: the control module 300 determines whether the print is completed. Namely, the control module 300 determines whether there is any of the multiple layers of the print data having been printed.

If the control module 300 determines the print is completed, the control module 300 finishes the print. Otherwise, the control module 300 performs the step S200-S214 again for selecting and printing the other layer of the multiple layers of print data (such as the second layer of the print data or the layer of the print data having the layer value "2"), and coloring the printed 3D slice physical model if necessary.

The present disclosed example can effectively reduce the used space of the print platform 307 occupied by the raft via making the auxiliary wall and the 3D physical model are arranged on the same raft. Besides, the present disclosed example has ability of manufacturing the color 3D physical model.

Figure 11A:
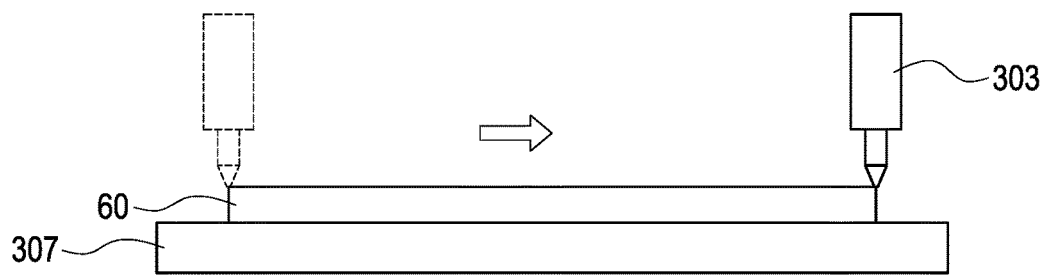
FIG. 11A is a first schematic view of print process according to one of embodiments of the present disclosed example.
Figure 11B:
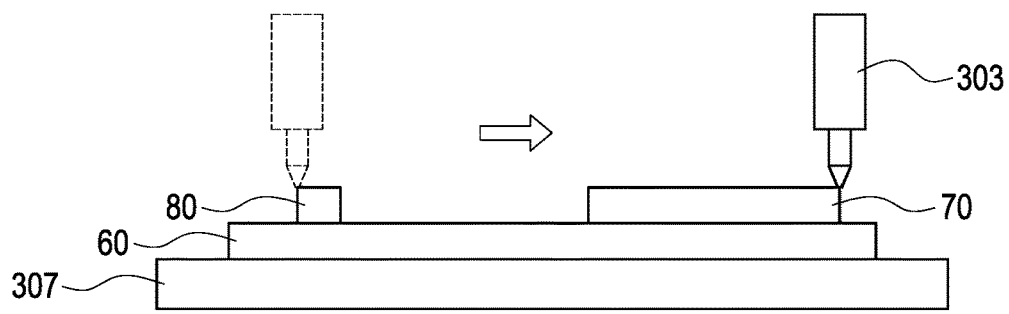
FIG. 11B is a second schematic view of print process according to one of embodiments of the present disclosed example.
Figure 11C:
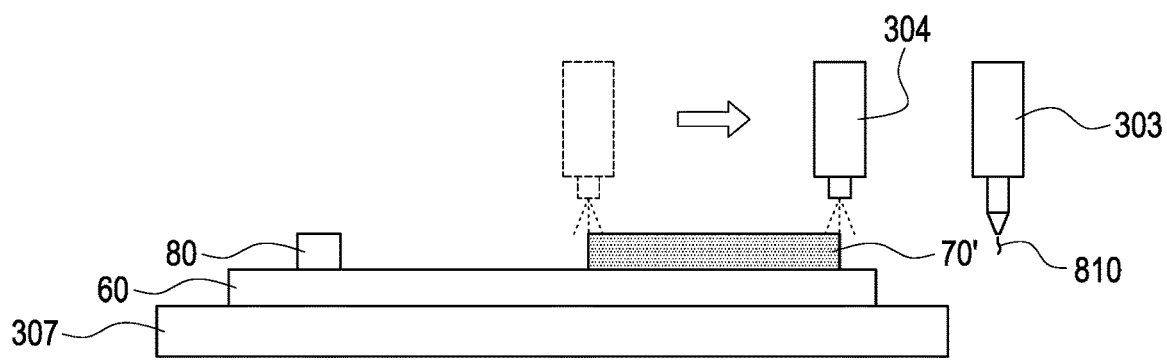
FIG. 11C is a third schematic view of print process according to one of embodiments of the present disclosed example.
Figure 11D:
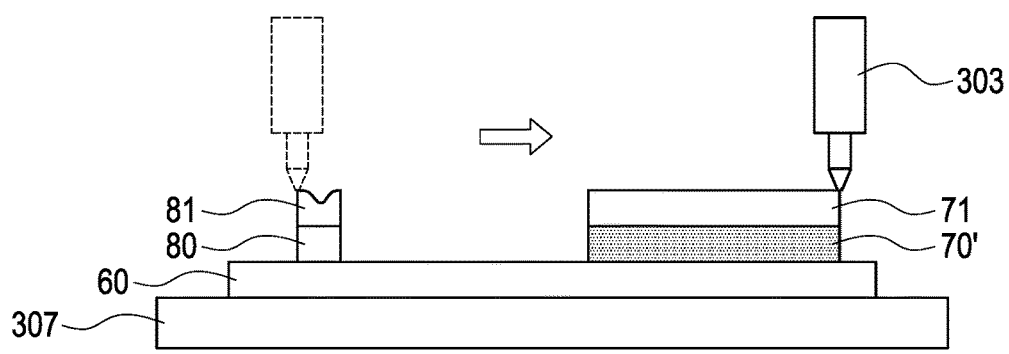
FIG. 11D is a fourth schematic view of print process according to one of embodiments of the present disclosed example.

Please refer to FIG. 10 to FIG. 11D simultaneously, FIG. 10 is a schematic view of physical model according to one of embodiments of the present disclosed example, FIG. 11A is a first schematic view of print process according to one of embodiments of the present disclosed example, FIG. 11B is a second schematic view of print process according to one of embodiments of the present disclosed example, FIG. 11C is a third schematic view of print process according to one of embodiments of the present disclosed example, and FIG. 11D is a fourth schematic view of print process according to one of embodiments of the present disclosed example. FIG. 10 to FIG. 11D are used to exemplary explain how to use the auxiliary wall to improve the print quality and execute the color printing.

In this example, the 3D physical model 7 and the auxiliary wall 8 share the same raft 6 as shown in FIG. 10. Moreover, this example is to print one layer of raft slice physical model 60 and configures the printed layer of raft slice physical model 60 as the raft 6.

During print, as shown in FIG. 11A, the modeling nozzle 303 first prints the first layer of the raft slice physical model 60 having the layer value "1". After completion of printing the first layer of the raft slice physical model 60, as shown in FIG. 11B, the modeling nozzle 303 prints one layer of the wall slice physical model 80 having the layer value "2" on the printed first layer of the raft slice physical model 60, and prints the same layer of the 3D slice physical model 70 having the layer value "2". After completion of printing the same layer of the 3D slice physical model 70, as shown in FIG. 11C, the coloring nozzle 304 jets ink on the printed 3D slice physical model 70 to form one layer of color coating for generating one layer of the color 3D slice physical model 70'. Finally, the control module 300 performs the print steps shown in FIG. 11B and FIG. 11C repeatedly to manufacture and color multiple layers of color 3D slice physical models stacked layer by layer, and the whole color 3D physical model 7 as shown in FIG. 10 is manufactured. Please be noted that the molten print materials (as the residual materials 810) may outflow from the modeling nozzle 303 during the coloring nozzle jetting the ink in the step as shown in FIG. 11C. For preventing the residual materials 810 from sticking the 3D physical model 7 and occurring the discontinuous provision of print materials when continuing to print next time, as shown in FIG. 11D, the modeling nozzle 303 first uses the residual materials 81 to print one layer of the wall slice physical model 81 for making sure that the continuous provision of print materials (namely, the discontinuous provision of print materials occurs during printing the layer of the wall slice physical model 81, there are some print defects on the layer of the wall slice physical model 81) and executes an material-scraping operation before start to print the next layer of the 3D slice physical model 71, then the modeling nozzle 303 prints the same layer of the 3D slice physical model 71. Thus, the present disclosed example can prevent the status of the discontinuous provision of print materials from occurring during printing the color 3D physical model 7, and improve the print quality.

Please be noted that the structure of the auxiliary wall 8 may be not compactness and easy to collapse during print because of the discontinuous provision of print materials. The present disclosed example can prevent the auxiliary wall 8 from collapsing, and increase a probability of printing successfully.

Figure 5:
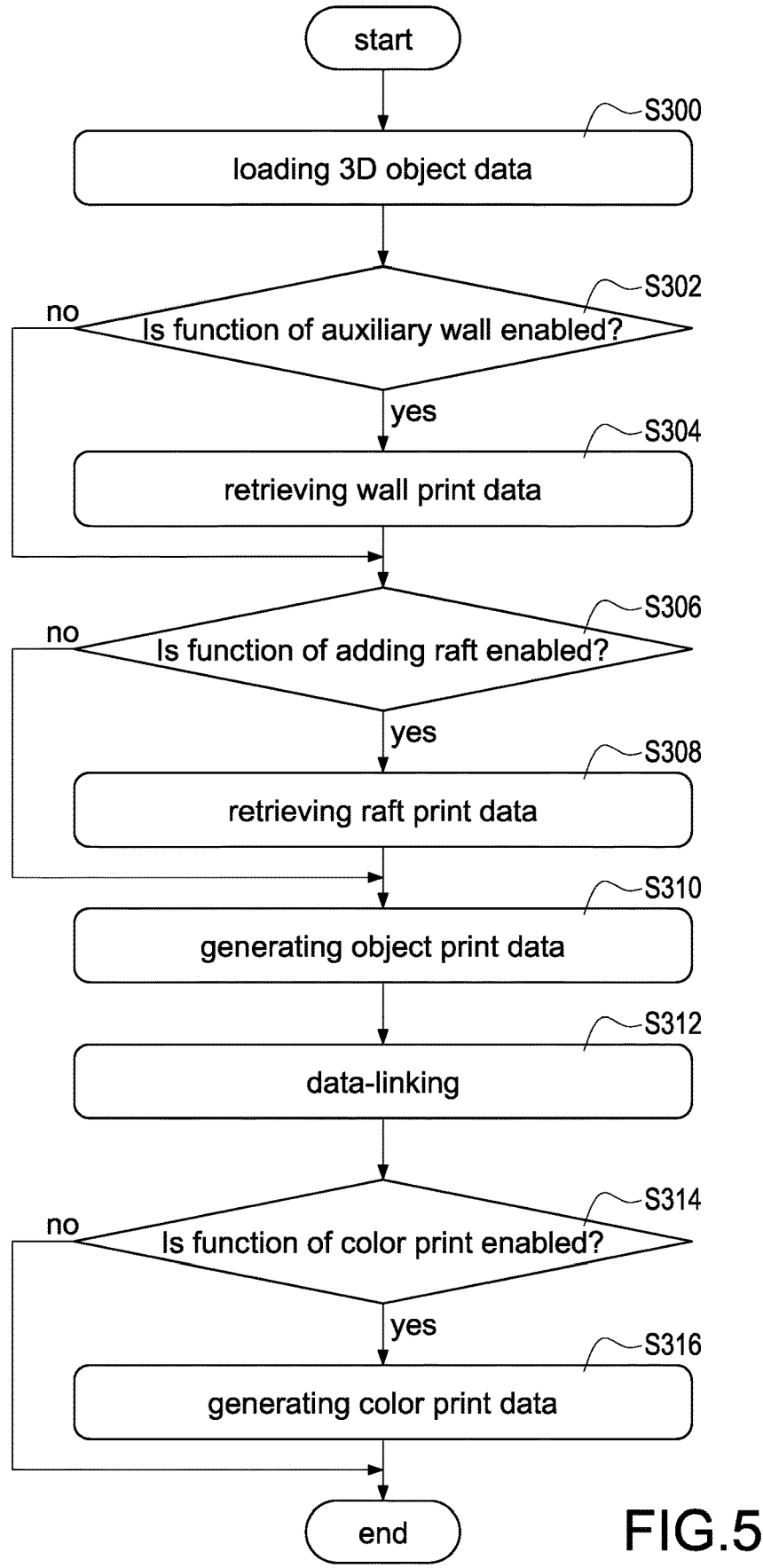
FIG. 5 is a partial flowchart of a printing method according to the third embodiment of the present disclosed example.

Please refer to FIG. 4 to FIG. 5 simultaneously, FIG. 5 is a partial flowchart of a printing method according to the third embodiment of the present disclosed example. The printing method of this embodiment further comprises a slicing process, the slicing process may generate multiple layers of print data, and above-mentioned multiple layers of print data is used for performing the print method shown in FIG. 3 or FIG. 4. The printing method of this embodiment further comprises following steps.

Step S300: the electronic device 2 loads a 3D object data corresponding to a 3D object after execution of the slicing software 20.

Step S302: the electronic device 2 determines whether the function of auxiliary wall is enabled, such as whether the user selecting the option of adding auxiliary wall before execution of the slicing process.

If the electronic device 2 determines that the function of auxiliary wall is enabled, the electronic device 2 performs step S304. Otherwise, the electronic device 2 performs step S306.

Step S304: the electronic device 2 retrieves multiple layers of wall print data. One of the exemplary embodiments, the multiple layers of the wall print data comprises a plurality of data sectors (such as each of the multiple layers of path data of the modeling nozzle 303) generated by execution of slicing process on the geometric information of wall object.

Step S306: the electronic device 2 determines whether the function of adding raft is enabled, such as whether the user selecting the option of adding raft before execution of the slicing process.

One of the exemplary embodiments, the system may further configure the option of adding a raft to the 3D object, the option of adding a raft to the wall object or the option of adding raft(s) to both 3D object and wall object according to selection of user or default configuration when the user configures the function of adding raft to be enable/disabled.

One of the exemplary embodiments, in the status of adding raft(s) to both the 3D object and the wall object, the system may configure that the 3D object and the auxiliary wall use the same or the different raft according to the selection of user or default configuration.

If the electronic device 2 determines the function of adding raft is enabled, the electronic device 2 performs step S308. Otherwise, the electronic device 2 performs step S310.

Step S308: the electronic device 2 retrieves the multiple layers of the raft print data corresponding to a raft object. One of the exemplary embodiments, the multiple layers of the raft print data comprises a plurality of data sectors (such as each of the multiple layers of the path data of the modeling nozzle 303) generated by execution of slicing process on the geometric information of raft object in advance.

One of the exemplary embodiments, if the 3D object and the wall object use the different rafts, the electronic device 2 calculates a size of each raft object according to a size of each object and a default outspreading distance (the first outspreading distance, such as 1 cm), and generates the corresponding raft print data. Thus, the present disclosed example can generate the multiple layers of the raft print data of the raft of the auxiliary wall.

One of the exemplary embodiments, if the 3D object is configured to add a raft, the electronic device 2 may generate the multiple layers of the object raft print data corresponding to the raft of the 3D object according to a size of 3D object and a default outspreading distance (the second outspreading distance, such as 0.5 centimeter).

One of the exemplary embodiments, the electronic device 2 may generate the multiple layers of the raft print data if the 3D object and the wall object share the same raft, above-mentioned multiple layers of the raft print data corresponds to a raft object enough to carry the 3D object and the wall object.

Step S310: the electronic device 2 executes slicing process for generating the multiple layers of the object print data according to geometric information of the 3D object data.

One of the exemplary embodiments, if a raft of the 3D object separates from a raft of the wall object and the 3D object is configured to add a raft, the electronic device 2 may add the object raft print data to the generated object print data for obtaining the new object print data (the new object print data corresponds to the 3D object added the raft).

Step S312: the electronic device 2 links the multiple layers of the wall print data, the multiple layers of the raft print data, and the multiple layers of object print data together based on layer values. More specifically, the electronic device 2 links a plurality of paths of the same layer of each print data together and be a single path. When the modeling nozzle prints along the linked path, the modeling nozzle can manufacture the corresponding wall slice physical model, raft slice physical model, and object physical model.

One of the exemplary embodiments, if a raft of the 3D object separates from a raft of the wall object, the electronic device 2 merges the raft print data with the wall print data (namely, the wall object is stacked on the raft as a single object) to multiple layers of merged data, and links each layer of the merged raft print data and wall print data (the merged data) and the same layer of the object print data together.

One of the exemplary embodiments, if the 3D object and the wall object are arranged on the same raft, the electronic device 2 configures the multiple layers of the raft print data as the bottom layer (such as the first layer) of the merged print data, configures the multiple layers of the wall print data and the object print data to be arranged on the raft print data, and links each of the multiple layers of the wall print data and the same layer of the object print data together.

Step S314: the electronic device 2 whether the function of color print is enabled.

If the electronic device 2 determines that the function of color print is enabled, the electronic device 2 performs step S316. Otherwise, the electronic device 2 terminate the slicing process.

Step S316: the electronic device 2 generates the multiple layers of the color print data according to the color information (such as color 2D image) of the 3D object data.

Thus, the present disclosed example can effectively generate the print data, and is capable of making the 3D printer implement the function of color print and the function of adding raft.

Figure 6:
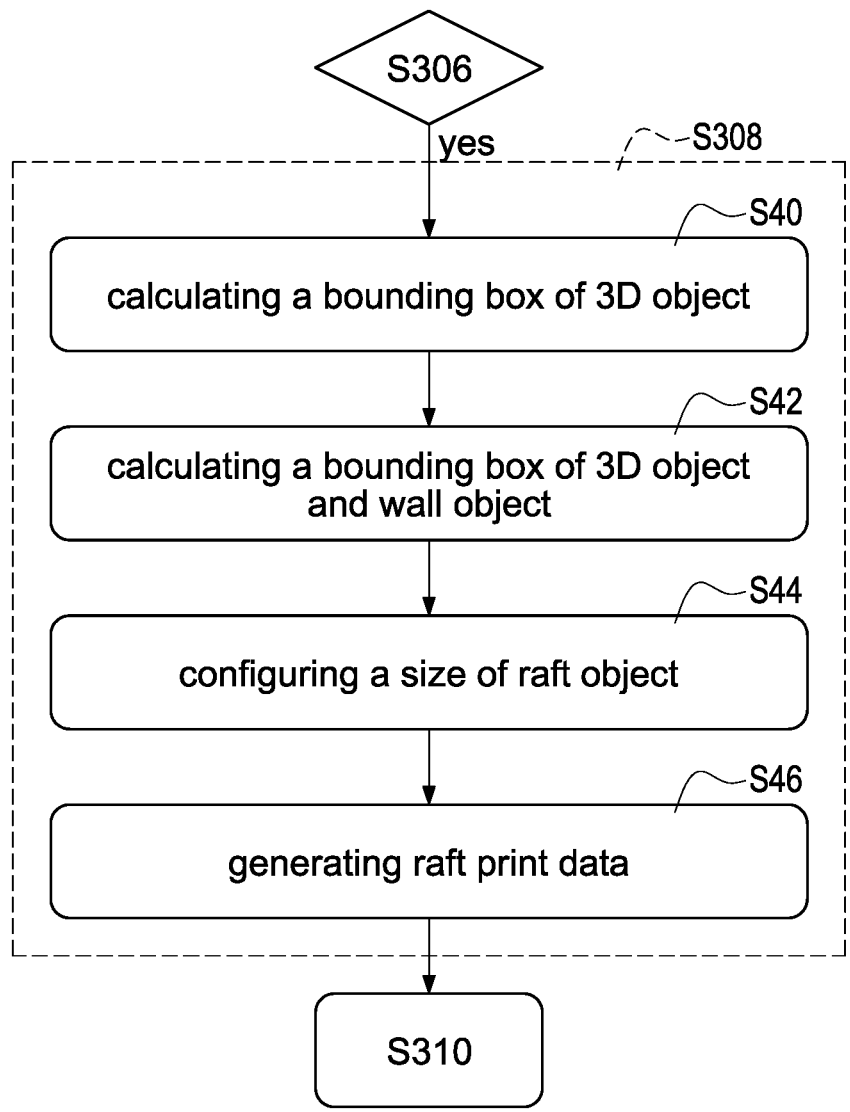
FIG. 6 is a partial flowchart of a printing method according to the fourth embodiment of the present disclosed example.
Figure 12:
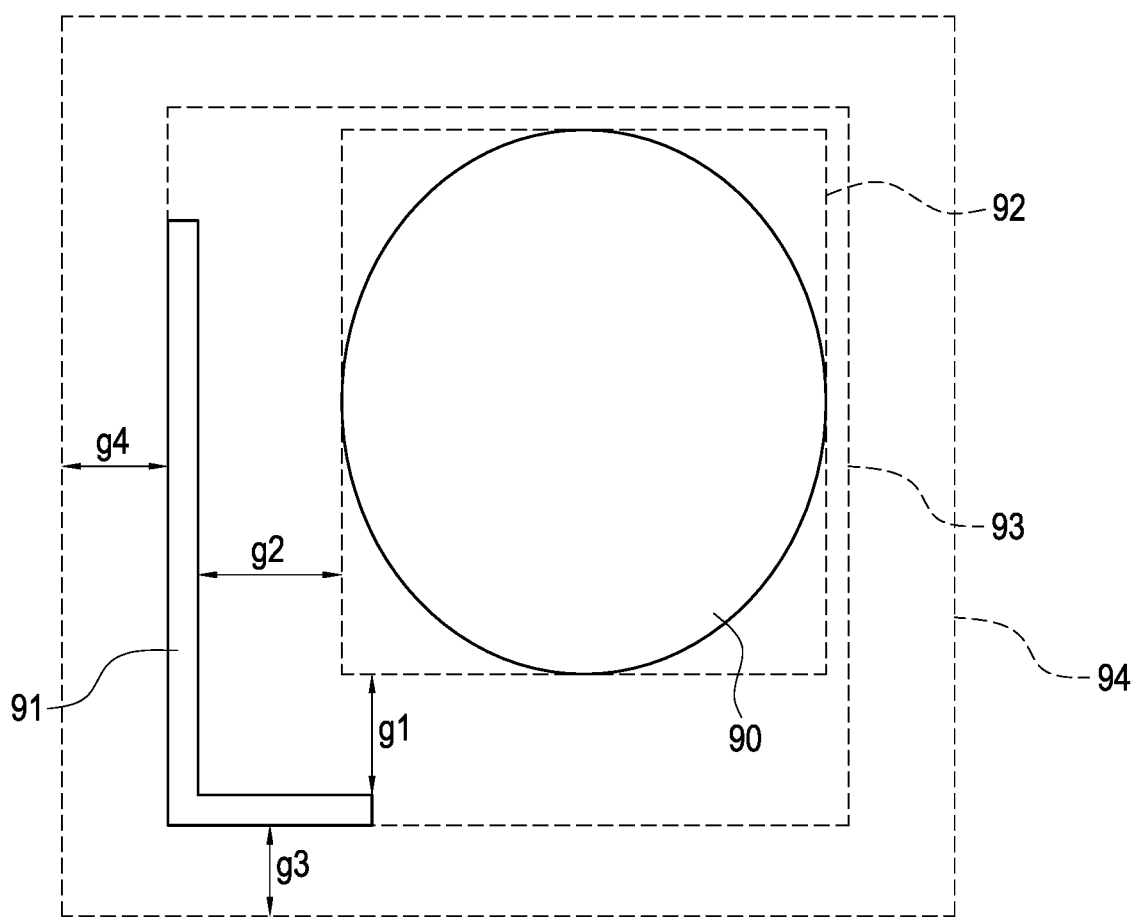
FIG. 12 is a schematic view of size of raft object according to one of embodiments of the present disclosed example.

Please refer to FIG. 4 to FIG. 6 and FIG. 12 simultaneously, FIG. 6 is a partial flowchart of a printing method according to the fourth embodiment of the present disclosed example, and FIG. 12 is a schematic view of size of raft object according to one of embodiments of the present disclosed example. In this example, the 3D object and the wall object are arranged on the same raft (sharing the same raft). This embodiment further implements a function of calculating size of raft. Via the function of calculating size of raft, this embodiment may calculate the size of the raft when the 3D object and the wall object are arranged on the same raft. Compare to the embodiment shown in FIG. 5, step S308 of this embodiment comprises following steps.

Step S40: the electronic device 2 retrieves a size of the 3D object 90 via analyzing the 3D object data, and calculates a range of a bounding box 92 (second bounding box) enclosing 3D object 90 according to the retrieved size of the 3D object 90.

Step S42: the electronic device 2 calculates a range of a bounding box 93 (first bounding box) enclosing the 3D object 90 and the wall object 91 according to the bounding box 92 enclosing the 3D object 90, a default vertical distance g1 (such as 2 cm), and a default horizontal distance g2 (such as 3 cm).

One of the exemplary embodiments, the vertical distance g1 may be the same as or different from the horizontal distance g2, but this specific example is not intended to limit the scope of the present disclosed example.

Step S44: the electronic device 2 configures a size of the raft object according to the bounding box 93 and a default outspreading distance.

One of the exemplary embodiments, the outspreading distance comprises a vertical outspreading distance g3 and a horizontal outspreading distance g4. The electronic device 2 configures the bounding box 93 vertically expand the vertical outspreading distance g3 for obtaining a new bounding box 94 (the third bounding box), and configures a range of the bounding box 94 as a size of the raft object.

Step S46: the electronic device 2 generates the corresponding multiple layers of the raft print data according to the configured size of the raft print data.

Thus, the present disclosed example can effectively calculate a size of a required raft when 3D object and a wall object share the same raft.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A 3D slicing and printing method using strengthened auxiliary wall applied to a 3D printer (3) comprising a print platform (307) and a modeling nozzle (303) and a slicing software (20) used to be installed in an electronic device (2), comprising following steps:
   a) retrieving 3D object data corresponding to a 3D object (90) at the electronic device (2) executing the slicing software (20);
   b) retrieving multiple layers of wall print data corresponding to a wall object (91);
   c) when a raft object separates from the 3D object (90), generating multiple layers of raft print data according to a size of the wall object (91) and a first outspreading distance for outspreading from the wall object (91);
   d) when the 3D object (90) and the wall object (91) are arranged on the raft object, calculating a first bounding box (93) enclosing the 3D object (90) and the wall object (91), configuring a size of the raft object according to the first bounding box (93) and at least one of a vertical outspreading distance (g3) for vertically expanding from the first bounding box (93) and a horizontal outspreading distance (g4) for horizontally expanding from the first bounding box (93), and generating the multiple layers of raft print data according to the size of the raft object;
   e) generating multiple layers of object print data according to geometric information of the 3D object data;
   f) linking the multiple layers of wall print data, the multiple layers of raft print data, and the multiple layers of object print data together based on layer values, wherein when the raft object separates from the 3D object (90), the multiple layers of raft print data and the multiple layers of wall print data are merged to multiple layers of merged data, and each of the multiple layers of merged data is respectively linked to each of the multiple layers of object print data having the same layer value together, when the 3D object (90) and the wall object (91) are arranged on the raft object, the multiple layers of raft print data are configured as the bottom layers, and each of the multiple layers of wall print data are respectively link to each of the multiple layers of object print data having the same layer value together;
   g) controlling the modeling nozzle (303) to print multiple layers of raft slice physical models (400,60) on the print platform (307) layer by layer according to the multiple layers of raft print data at the 3D printer (3);
   h) controlling the modeling nozzle (303) to print multiple layers of wall slice physical models (420-421,80-81) on the multiple layers of printed raft slice physical models (400,60) layer by layer according to the multiple layers of wall print data after completion of printing all of the multiple layers of raft slice physical models (400,60), wherein the multiple layers of raft slice physical models (400,60) are for increasing a contact area between the multiple layers of wall slice physical models (420-421,80-81) and the print platform (307), and printing of the multiple layers of wall slice physical models (420-421,80-81) is for ensuring that the modeling nozzle (303) is under a status of continuous provision of print materials every time the modeling nozzle (303) stops waiting and continues to print; and
   i) controlling the modeling nozzle (303) to print multiple layers of 3D slice physical models (50-53, 70-71) layer by layer according to the raft slice physical models (400,60) of the object print data during printing the multiple layers of raft slice physical models (400,60) and the multiple layers of wall slice physical models (420-421,80-81), wherein when the raft object separates from the 3D object (90), the multiple layers of 3D slice physical models (50-53,70-71) are printed at a position of the print platform (307) different than the multiple layers of wall slice physical models, when the 3D object (90) and the wall object (91) are arranged on the raft object, the multiple layers of 3D slice physical models (50-53,70-71) are printed on the multiple layers of raft slice physical models (400,60) layer by layer after completion of printing the multiple layers of raft slice physical models (400,60).

2. The 3D slicing and printing method using strengthened auxiliary wall according to claim 1, wherein the step i) comprises a step i1) at the 3D printer (3), controlling the modeling nozzle (303) to execute a material-scraping operation on the multiple layers of wall slice physical models (420-421,80-81) for removing residual materials (4210) remained on the modeling nozzle (303).

3. The 3D slicing and printing method using strengthened auxiliary wall according to claim 1, wherein the step g), the step h) and the step i) are configured to control the modeling nozzle (303) to heat and extrude molten thermoplastic print materials to manufacture the next layer of raft slice physical models (400,60), the next layer of wall slice physical models (420-421,80-81) and the next layer of 3D slice physical models (50-53,70-71) after completion of printing the current layer of raft slice physical models (400,60), the current layer of wall slice physical models (420-421,80-81) and the current layer of 3D slice physical models (50-53,70-71).

4. The 3D slicing and printing method using strengthened auxiliary wall according to claim 3, wherein the 3D printer (3) comprises a coloring nozzle (304), the 3D slicing and printing method using strengthened auxiliary wall further comprises following steps:
   j1) at the 3D printer (3), retrieving multiple layers of color print data based on the layer values; and
   j2) controlling the coloring nozzle (304) to color each of the multiple layers of 3D slice physical models (50-53,70-71) according to the same layer of color print data having the same layer value after completion of printing each of the multiple layers of 3D slice physical models (50-53,70-71).

5. The 3D slicing and printing method using strengthened auxiliary wall according to claim 4, further comprising a step k) before the step g), generating the multiple layers of color print data according to color information of the 3D object data at the electronic device (2) executing the slicing software (20).

6. The 3D slicing and printing method using strengthened auxiliary wall according to claim 1, wherein the step e) comprises:
   e1) generating multiple layers of object raft print data according to a size of the 3D object (90) and a second outspreading distance for outspreading from the 3D object (90);
   e2) generating the multiple layers of object print data according to the geometric information of the 3D object data; and
   e3) adding the multiple layers of object raft print data to the multiple layers of object print data.

7. The 3D slicing and printing method using strengthened auxiliary wall according to claim 1, wherein the step d) is executed to:
   calculate a second bounding box (92) enclosing the 3D object (90)

and calculate the first bounding box (93) according to the second bounding box (92), a horizontal distance (g2) between the 3D object (90) and the wall object (91) and a vertical distance (g1) between the 3D object (90) and the wall object (91).

\* \* \* \* \*